United States Patent
Hagiwara

(10) Patent No.: US 11,470,230 B2
(45) Date of Patent: Oct. 11, 2022

(54) LENS DRIVING DEVICE, CAMERA DEVICE, AND ELECTRONIC APPARATUS

(71) Applicant: New Shicoh Motor Co., Ltd., Zhejiang (CN)

(72) Inventor: Kazuyoshi Hagiwara, Kanagawa (JP)

(73) Assignee: NEW SHICOH MOTOR CO., LTD., Zhejiang (CN)

( * ) Notice: Subject to any disclaimer, the term of this patent is extended or adjusted under 35 U.S.C. 154(b) by 93 days.

(21) Appl. No.: 17/089,976

(22) Filed: Nov. 5, 2020

(65) Prior Publication Data

US 2021/0144280 A1 May 13, 2021

(30) Foreign Application Priority Data

Nov. 13, 2019 (JP) .............................. JP2019-205168

(51) Int. Cl.
  *H04N 5/225* (2006.01)
  *H04N 5/232* (2006.01)
  *H04M 1/02* (2006.01)

(52) U.S. Cl.
  CPC ........ *H04N 5/2254* (2013.01); *H04M 1/0264* (2013.01); *H04N 5/2253* (2013.01); *H04N 5/2257* (2013.01); *H04M 2250/52* (2013.01)

(58) Field of Classification Search
  CPC .. H04N 5/2251; H04N 5/2252; H04N 5/2328; H04N 5/23287
  USPC .......................................... 348/208.7, 208.11
  See application file for complete search history.

(56) References Cited

U.S. PATENT DOCUMENTS

| 4,081,812 A * | 3/1978 | Flother .................... G03B 5/00 359/813 |
| 4,745,589 A | 5/1988 | Nomura |
| 2006/0070302 A1* | 4/2006 | Seo ..................... H04N 5/23287 52/6 |
| 2009/0060485 A1 | 3/2009 | Takahashi |

(Continued)

FOREIGN PATENT DOCUMENTS

| JP | S61-87227 | 5/1986 |
| JP | 2006-343470 | 12/2006 |

(Continued)

OTHER PUBLICATIONS

Japanese Office Action dated Mar. 8, 2022 in related Japanese patent application No. 2019-205168 and English translation.

(Continued)

*Primary Examiner* — Anthony J Daniels
(74) *Attorney, Agent, or Firm* — Fildes & Outland, P.C.

(57) ABSTRACT

A lens driving device, includes: a fixing portion; a lens support; a first slider; a second slider held by the first slider so as to be slidable in a first direction; and a third slider which is provided on the lens support, and is held by the second slider so as to be slidable in a second direction, wherein any one of the first slider and the second slider has a first projecting member extending along the first direction, and another one of the first slider and the second slider has a first groove that is to fit aver the first projecting member, and wherein any one of the second slider and the third slider has a second projecting member extending along the second direction, and another one of the second slider and the third slider has a second groove that is to fit over the second projecting member.

14 Claims, 11 Drawing Sheets

(56) References Cited

U.S. PATENT DOCUMENTS

| | | | | |
|---|---|---|---|---|
| 2018/0356646 A1* | 12/2018 | Hu | .......................... | G02B 7/10 |
| 2019/0377155 A1* | 12/2019 | Bachar | ................. | G02B 27/646 |
| 2019/0377249 A1* | 12/2019 | Miyazaki | ................. | G03B 5/02 |
| 2021/0006720 A1* | 1/2021 | Enta | ........................ | G03B 5/00 |

FOREIGN PATENT DOCUMENTS

| | | |
|---|---|---|
| JP | 2009-053554 | 3/2009 |
| JP | 2013-152406 | 8/2013 |
| JP | 2013-246301 | 12/2013 |
| WO | 2016/166730 | 10/2016 |

OTHER PUBLICATIONS

English language machine translation of JP2006-343470.
English language machine translation of JP2013-246301.
English language machine translation of JP2013-152406.

\* cited by examiner

LENS DRIVING DEVICE, CAMERA DEVICE, AND ELECTRONIC APPARATUS

TECHNICAL FIELD

The present invention relates to a lens driving device, a camera device, and an electronic apparatus.

BACKGROUND ART

A small-sized camera is mounted on an electronic apparatus, e.g., a mobile phone or a smart phone. As this type of small-sized camera, for example, as disclosed in WO 2016/166730, there is known a lens driving device in which a prism is combined or mutually-movable lenses are arranged in parallel so that an optical axis of the lens is directed in an in-plane direction of a smartphone.

However, in the above-mentioned related art, four thin hanging wires hang a lens support so as to swing the lens support. In this case, the lens support may be unintentionally rotated, and thus precise position control has been difficult.

SUMMARY

The present invention has an object to provide a lens driving device, a camera device, and an electronic apparatus, in which precise position control is enabled.

One aspect of the present invention is a lens driving device. The lens driving device includes: a fixing portion; a lens support configured to support a lens; a first slider fixed to the fixing portion; a second slider held by the first slider so as to be slidable in a first direction corresponding to any one of an optical axis direction of the lens and one direction orthogonal to the optical axis direction; and a third slider which is provided on the lens support, and is held by the second slider so as to be slidable in a second direction corresponding to another one of the optical axis direction of the lens and the one direction orthogonal to the optical axis direction. Any one of the first slider and the second slider has a first projecting member extending along the first direction, and another one of the first slider and the second slider has a first groove that is to fit over the first projecting member. Any one of the second slider and the third slider has a second projecting member extending along the second direction, and another one of the second slider and the third slider has a second groove that is to fit over the second projecting member.

Preferably, a magnet is provided on any one of the fixing portion and the lens support, and a coil provided on another one of the fixing portion and the lens support.

In order to decrease the height of the lens driving device in the direction orthogonal to the optical axis direction, the first slider may be formed into a quadrangular frame shape and have a first accommodation part that is formed by cutting out a side portion of the first slider inward, and a first corner portion that is formed at a corner portion of the first slider, and one of the magnet and the coil may be accommodated in the first accommodation part. Further, the third slider may be formed into a quadrangular frame shape and have a third accommodation part that is formed by cutting out a side portion of the third slider inward, and a third corner portion that is formed at a corner portion of the third slider, and one of the coil and the magnet may be accommodated in the third accommodation part. Further, the second slider may be formed into a quadrangular frame shape and have a second accommodation part that is formed by cutting out a side portion of the second slider inward, and a second corner portion that is formed at a corner portion of the second slider, and a part of at least one of the magnet and the coil may be accommodated in the second accommodation part.

Further, in order to ensure drive stability, the first projecting member, the first groove, the second projecting member, and the second groove may be arranged in the first corner portion, the second corner portion, or the third corner portion.

It is preferred that the second accommodation part have an end surface separated away from one of the coil and the magnet accommodated in the second accommodation part by a distance equal to or larger than a distance by which the second slider slides so that a sliding width of the second slider is left.

Further, a magnetic plate member may be provided on the another one of the fixing portion and the lens unit across the coil so that movement between the fixing portion and the lens unit in the optical axis direction of the lens is restricted.

Further, the first slider, the second slider, and the third slider may be formed into quadrangular frame shapes having a first corner portion, a second corner portion, and a third corner portion, respectively, at least one of the first corner portion, the second corner portion, or the third corner portion may have a first part extending in the optical axis direction and a second part further extending in the one direction orthogonal to the optical axis direction, and among the first projecting member, the first groove, the second projecting member, and the second groove, portions extending along the optical axis direction may be arranged in the first part, and portions extending along the one direction may be arranged in the second part.

The lens support and the third slider may be formed integrally with each other.

Another aspect of the present invention is a camera device including the lens driving device. Further, yet another aspect of the present invention is an electronic apparatus including the camera device.

According to at least one embodiment of the present invention, the first slider, the second slider, and the third slider are provided. The first projecting member extending along the first direction is formed on any one of the first slider and the second slider, and the first groove that is to fit over the first projecting member is formed in the another one of the first slider and the second slider. Further, the second projecting member extending along the second direction is formed on any one of the second slider and the third slider, and the second groove that is fit over the second projecting member is formed in the another one of the second slider and the third slider. In this manner, deviation of the lens support with respect to the substrate can be reduced, and precise position control is enabled.

DESCRIPTION OF THE EMBODIMENTS

An embodiment of the present invention will be described below with reference to the drawings.

Figure 1:
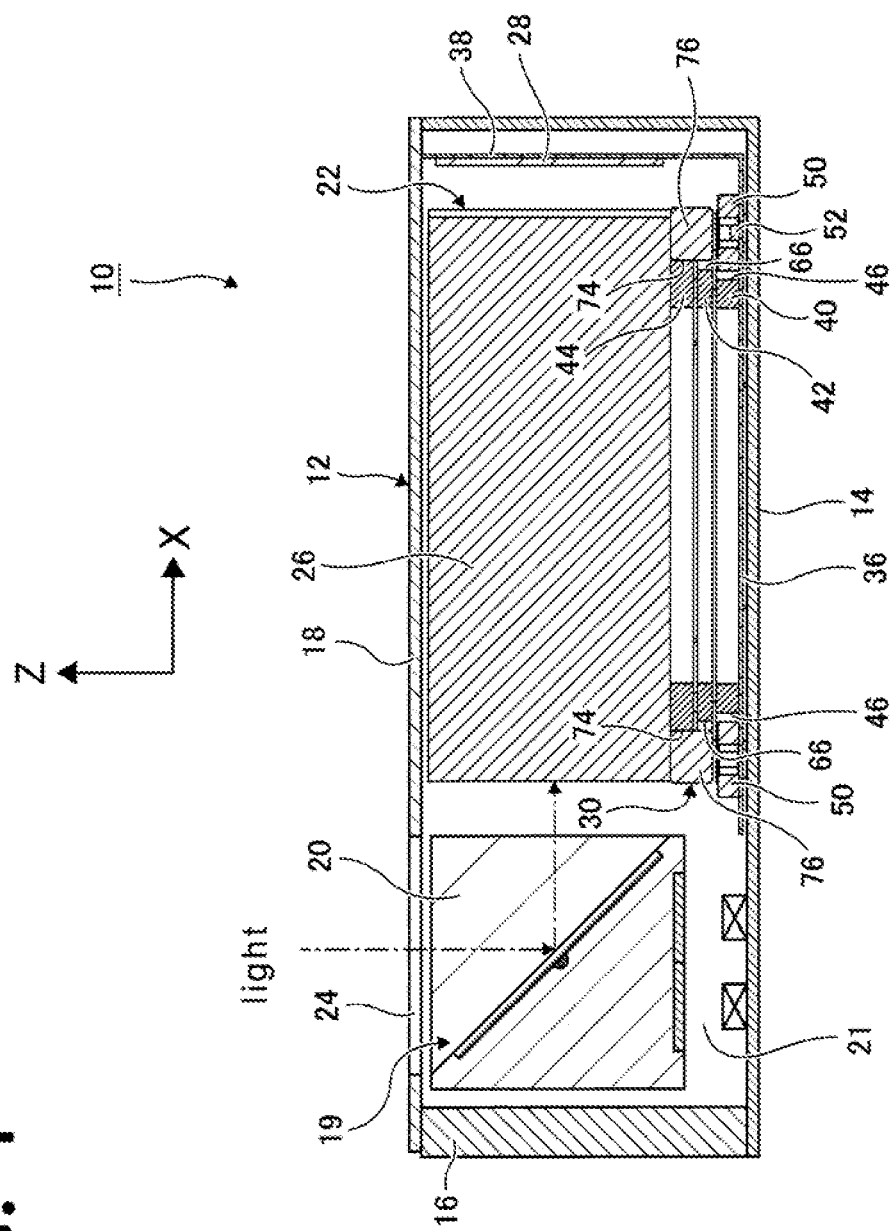
FIG. 1 is a sectional view for illustrating a camera device according to an embodiment of the present invention.
Figure 2:
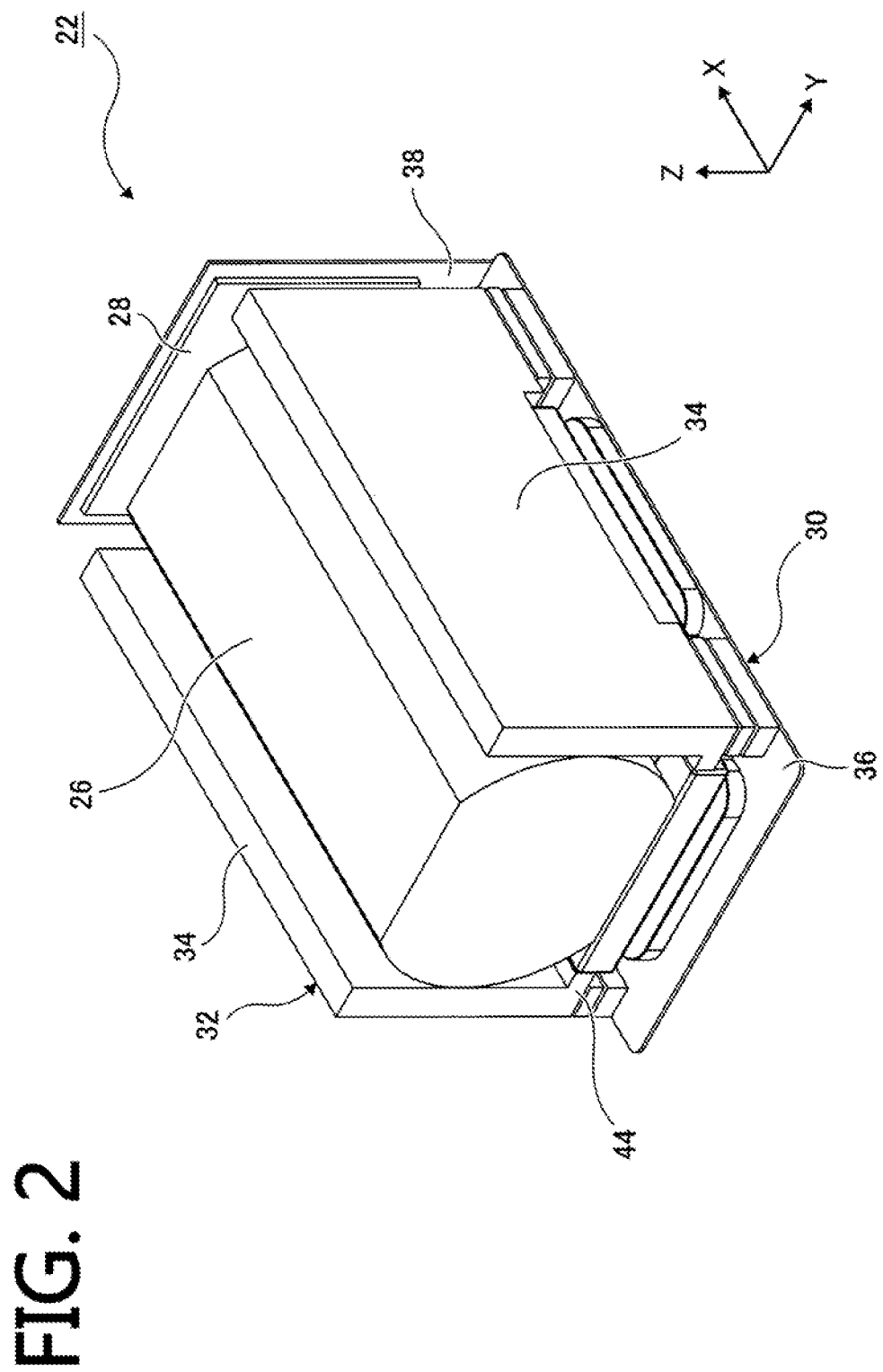
FIG. 2 is a perspective view for illustrating a lens unit used in the camera device according to the embodiment of the present invention as viewed obliquely from above.
Figure 3:
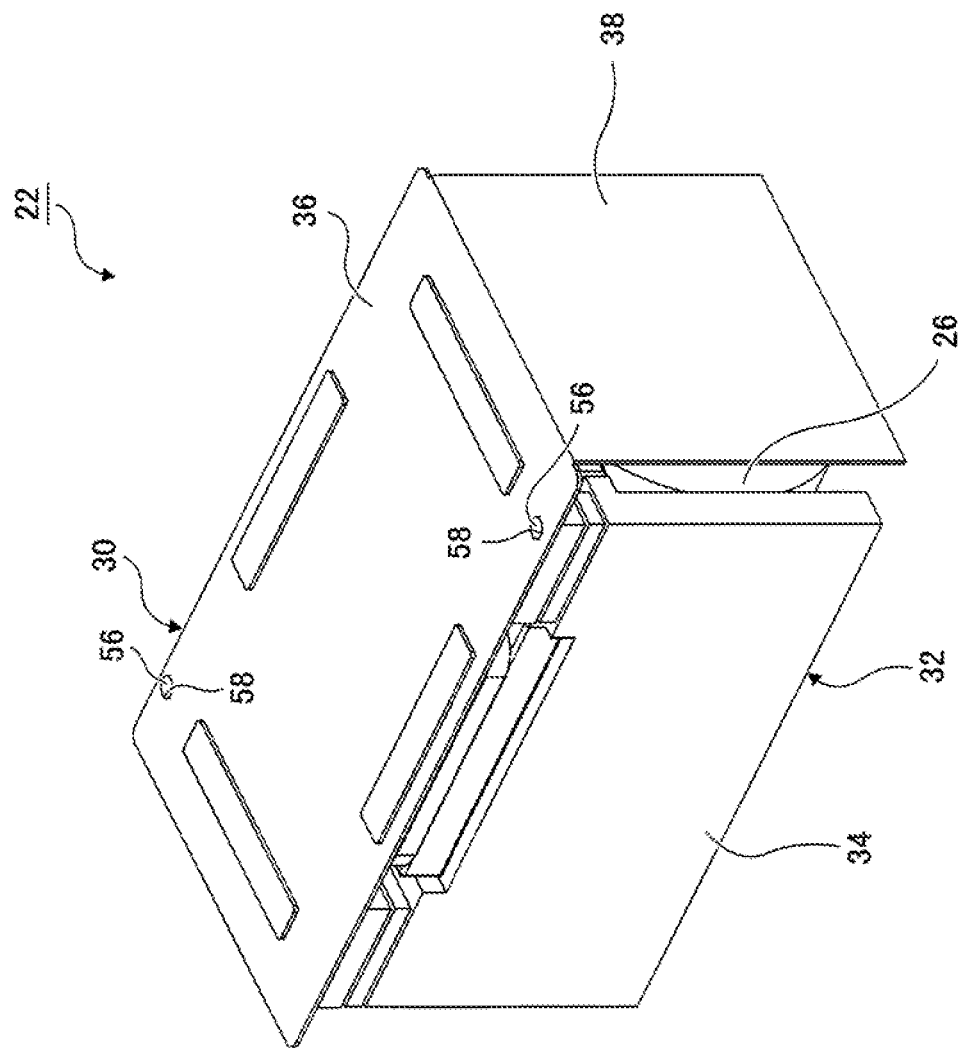
FIG. 3 is a perspective view for illustrating the lens unit used in the camera device according to the embodiment of the present invention as viewed obliquely from below.
Figure 4:
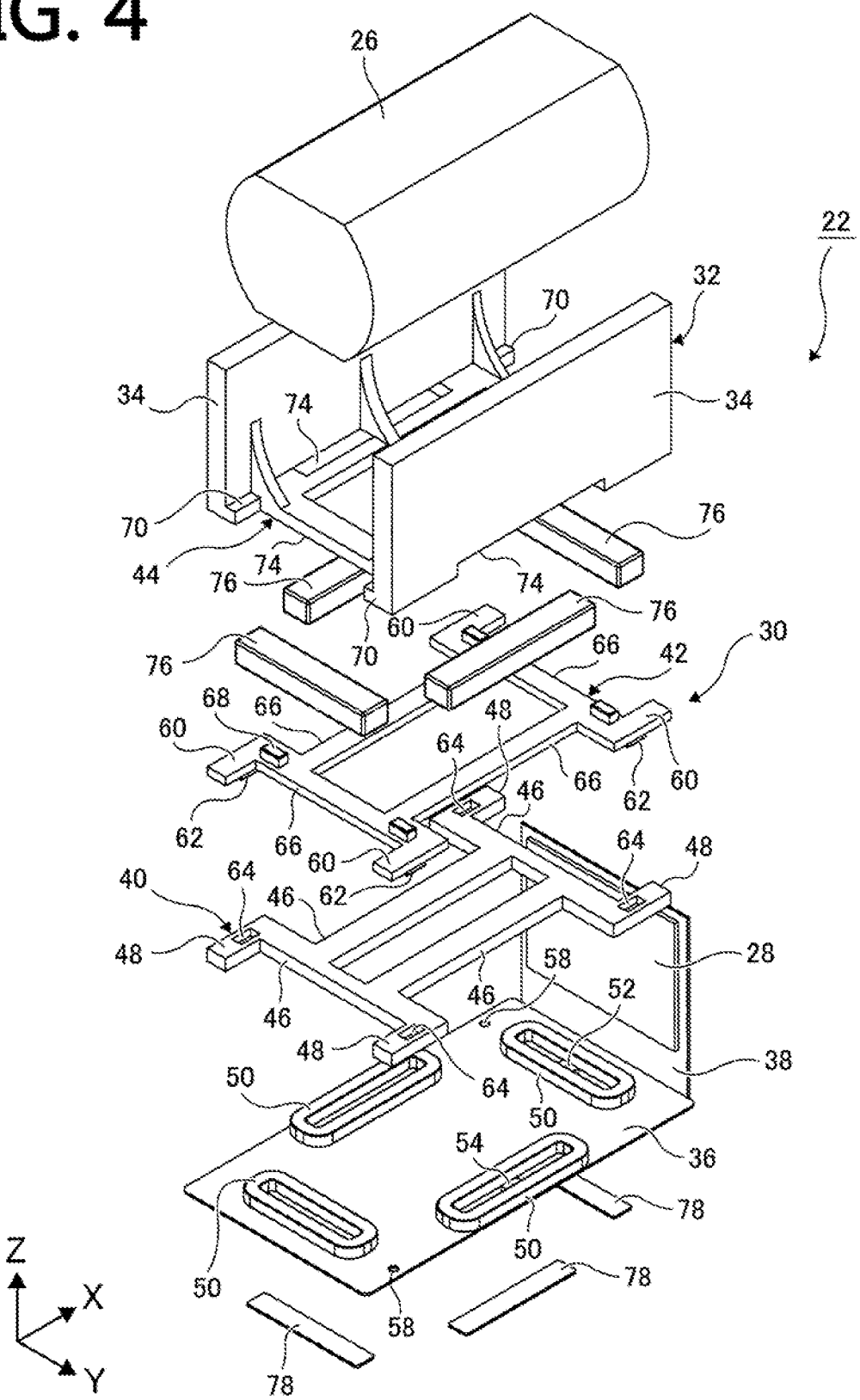
FIG. 4 is an exploded perspective view for illustrating the lens unit used in the camera device according to the embodiment of the present invention as viewed obliquely from above.

FIG. 1 is an illustration of a camera device 10 according to the embodiment of the present invention. The camera device 10 includes a cuboid casing 12. This casing 12 includes a main body portion 14, a rear cover 16, and an upper cover 18. A rear part and an upper part of the main body portion 14 are open. The rear cover 16 is fixed to the main body portion 14 so as to cover the rear side of the main body portion 14. The upper cover 18 is fixed to the main body portion 14 so as to cover the upper portion of the main body portion 14.

In this specification an optical axis direction of a lens 26 described later is herein referred to as "X direction", a direction orthogonal to the X direction is referred to as "Y direction", and a direction orthogonal both to the X direction and the Y direction is referred to as "Z direction". Further, one side in the X-axis direction is referred to as "front", and another side in the X-axis direction is referred to as "rear". One side in the Y direction is referred to as "left", and another side in the direction is referred to as "right". One side in the Z direction is referred to as "upper", and another side in the Z direction is referred to as "lower". An imaging target is to be present on the +Z side, and an image sensor 28 described later is present on the +X side.

The camera device 10 includes a prism unit 19 and a lens unit 22. The prism unit 19 is accommodated in the casing 12 and is located on the rear side, and the lens unit 22 is accommodated in the casing 12 and is located on the front side.

The prism unit 19 is provided below a light incident window 24 formed in the upper cover 18. The prism unit 19 includes a prism 20 and a prism driver 21. The prism 20 forms an optical member for forming an optical system having a folded optical axis, and has a triangular cross-sectional shape. One surface of the prism 20 faces the light incident window 24, and another surface faces the lens 26 of the lens unit 22. A surface between those two surfaces forms a reflective surface at an angle of 45 degrees. The prism 20 is able to be driven to rotate about the Y axis by the prism driver 21.

Light from the imaging target entering the casing 12 through the light incident window 24 in the Z-axis direction is bent at 90 degrees by the prism 20 toward the X-axis direction, to thereby be transmitted to the lens 26. In this case, when the prism 20 is rotated about the Y axis, the light exiting from the prism 20 deviates in the Z-axis direction, and thus a light position in the Z-axis direction of the light entering the image sensor 28 is adjusted.

As illustrated in FIG. 2 to FIG. 10 as well, the leas unit 22 includes the lens 26 configured to focus the light exiting from the prism 20 and directing to the image sensor 28. Further, the lens unit 22 includes a lens driving device 30 configured to drive the lens 26. This lens driving device 30 includes a lens support 32 configured to fix the lens 26. The lens support 32 includes support walls 34 and 34 formed on both sides of the lens support 32, i.e. at the right side and left side thereof. Further, on the lower side of the lens support 32, a third slider 44 described later is formed integrally with the support walls 34 and 34 so as to connects the support walls 34 and 34.

Further, the lens driving device 30 includes a substrate 36 serving as a plate-shaped fixing portion that is fixed to a bottom surface of the above-mentioned casing 12. An image sensor fixing portion 38 is formed at a front side end of the substrate 36 so as to be upright in the Z direction. The image sensor 28 is fixed to this image sensor fixing portion 38 so as to be opposed to a front side end of the lens 26. The above-mentioned fixing portion includes the casing 12 and the substrate 36, while the lens support 32 is moved relative to the fixing portion.

Further, the lens driving device 30 includes a first slider 40, a second slider 42, and the third slider 44. The first slider 40, the second slider 42, and the third slider 44 are formed as frame members having substantially the same quadrangular outer circumference as viewed from the Z direction.

The first slider 40 is fixed to the substrate 36. First accommodation parts 46 are respectively formed in the four sides of the first slider 40. The First accommodation parts 46 are formed by being cut out into a quadrangular groove shape inward in X-Y directions, with four first corner portions 48 being left uncut. Coils 50 are accommodated in the first accommodation part 46, respectively. Each of the first corner portions 48 includes a proximal end portion and a distal end portion. The proximal end portion extends as a longitudinal planar lug in the Y direction from a main body part of the first slider 40. The distal end portion extends as a longitudinal planar lug in the X direction further from the proximal end portion.

The substrate 36 has the coils 50 fixed on the upper surface of the substrate 36 in the vicinity of the four sides thereof. Each of the coils 50 includes two linear parts extending along the X direction or the Y direction, and semicircular connecting parts each connecting between those two linear parts. A longitudinal distance of the first accommodation part 46 from one end to another end is substantially equal to the overall longitudinal length of the linear parts of the coil 50. A cut-out length (cut-out depth from each side) at each side ends of the first accommodation part 46 is equal to or slightly larger than the overall width in the semicircular connecting parts of the coil 50. Further, a Z-direction thickness of the coil 50 is substantially equal to a Z-direction thickness of the first slider 40.

Figure 11:
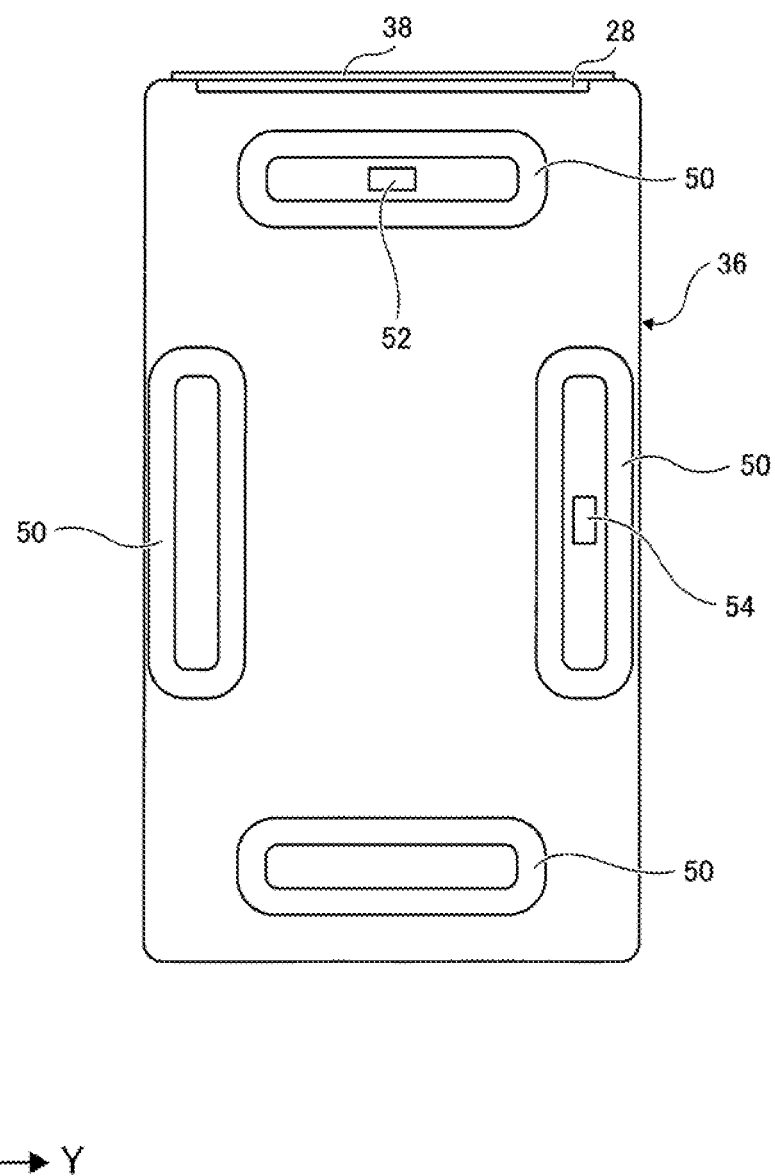
FIG. 11 is a plan view of a substrate used in the camera device according to the embodiment of the present invention.

Further, as best illustrated in FIG. 11, an X-direction position detector 52 configured to detect an X-direction position of the lens support 32 is provided inside one coil 50 arranged in the X direction. Further, a Y-direction position detector 54 configured to detect a Y-direction position of the lens support 32 is provided inside one coil 50 arranged in the Y direction.

Figure 5:
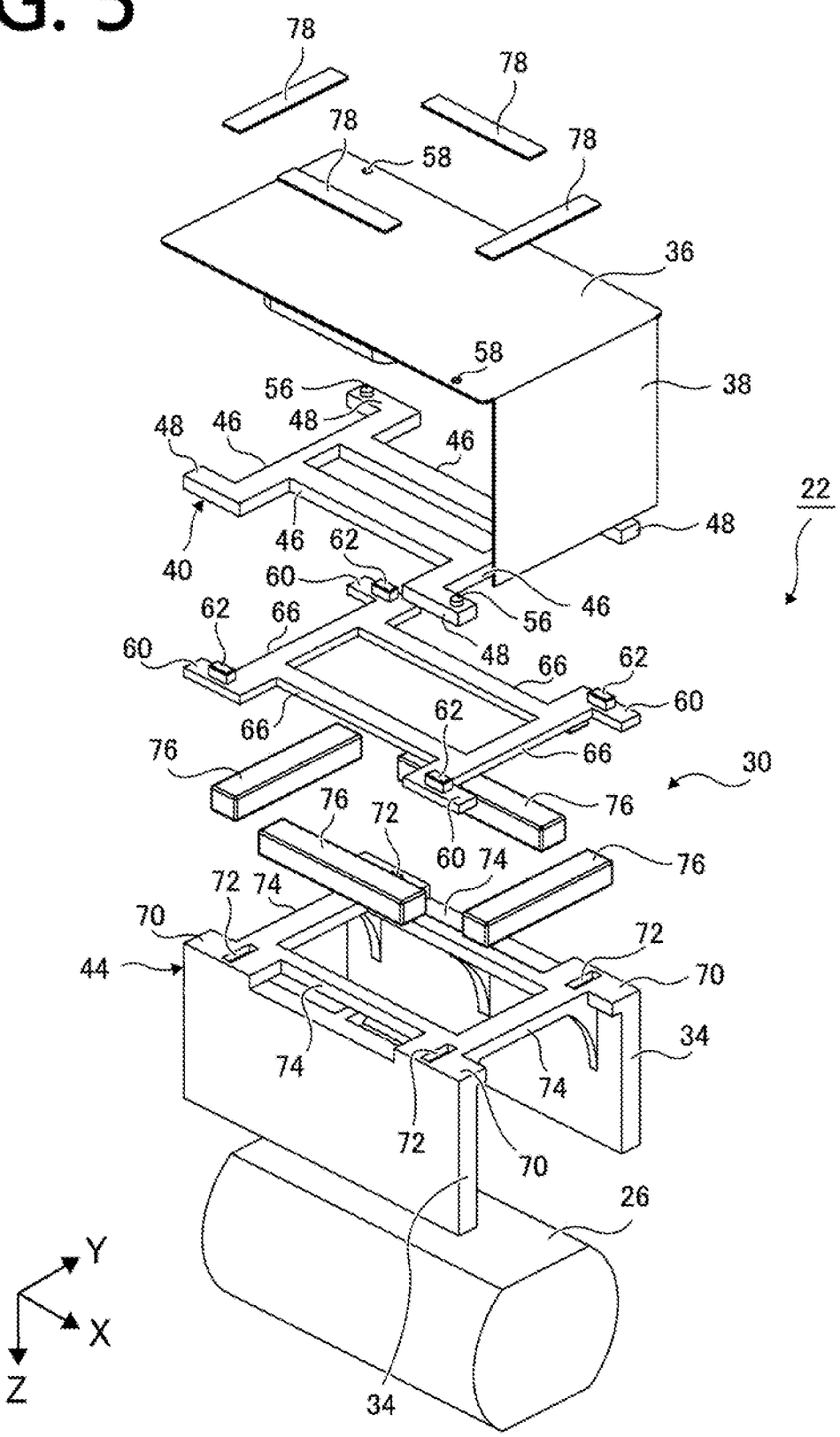
FIG. 5 is an exploded perspective view for illustrating the lens unit used in the camera device according to the embodiment of the present invention as viewed obliquely from below.
Figure 6:
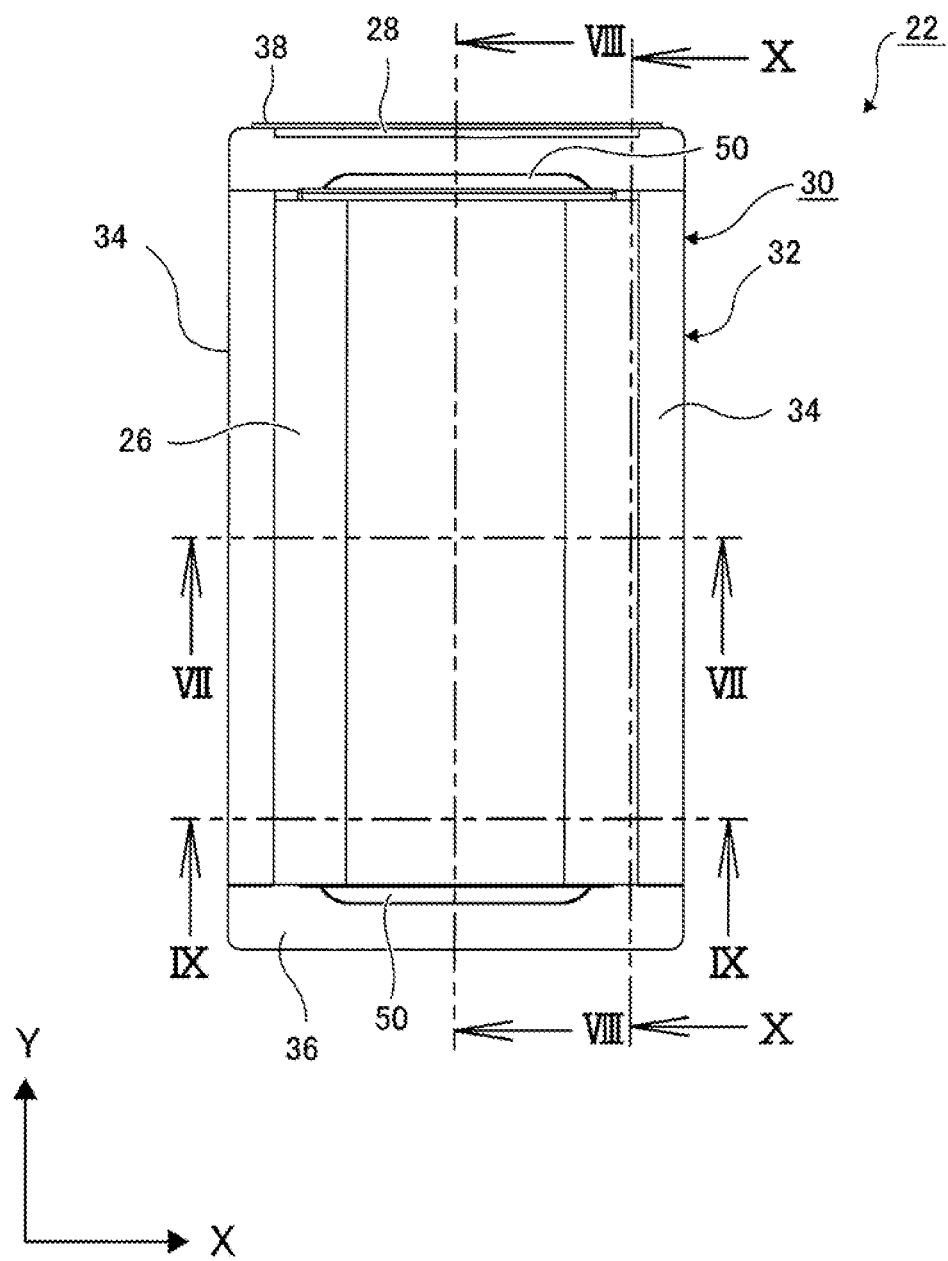
FIG. 6 is a plan view for illustrating the lens unit used in the camera device according to the embodiment of the present invention.
Figure 7:
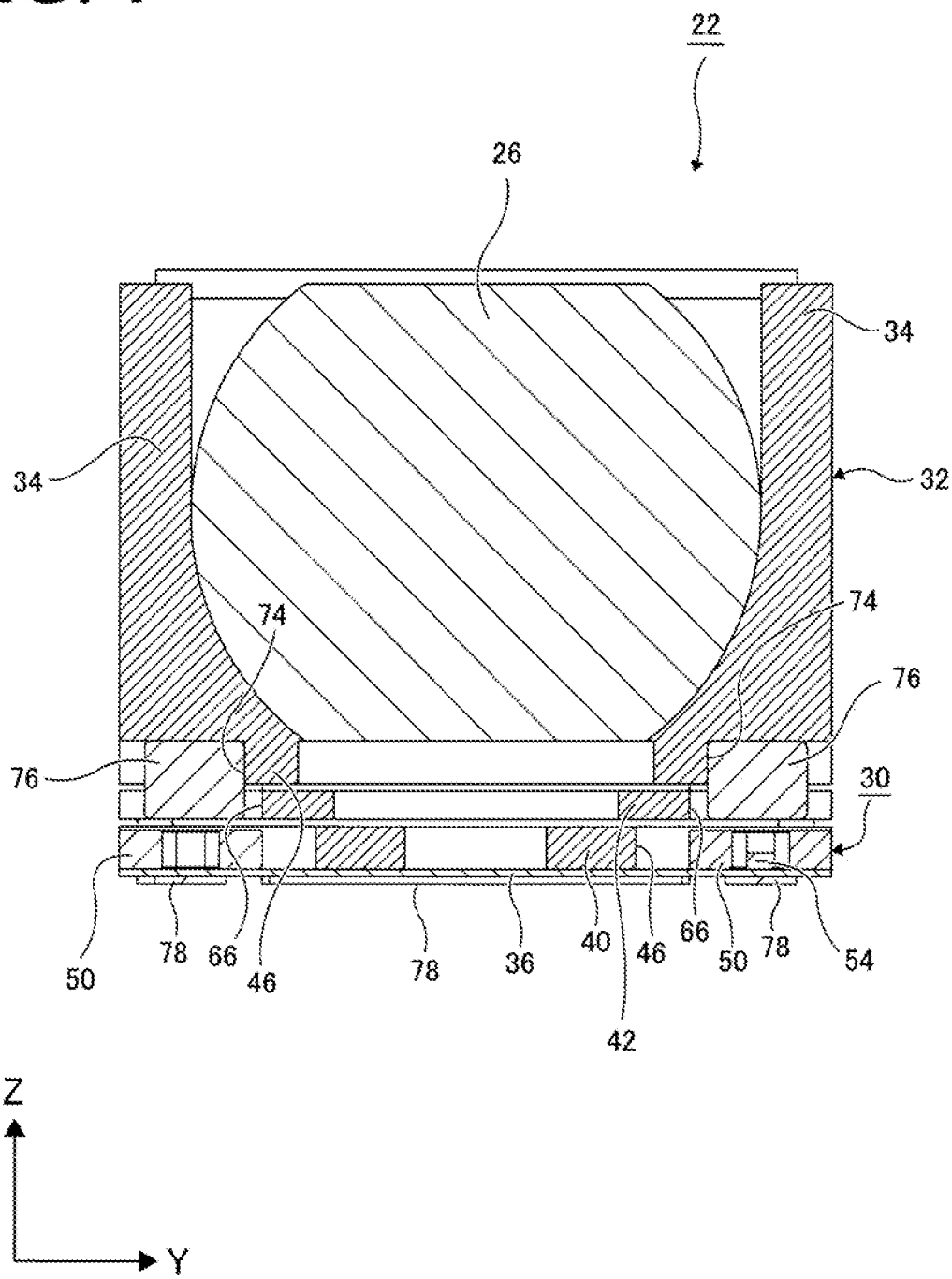
FIG. 7 is a sectional view taken along the line VII-VII of FIG. 6 for illustrating the lens unit used in the camera device according to the embodiment of the present invention.
Figure 8:
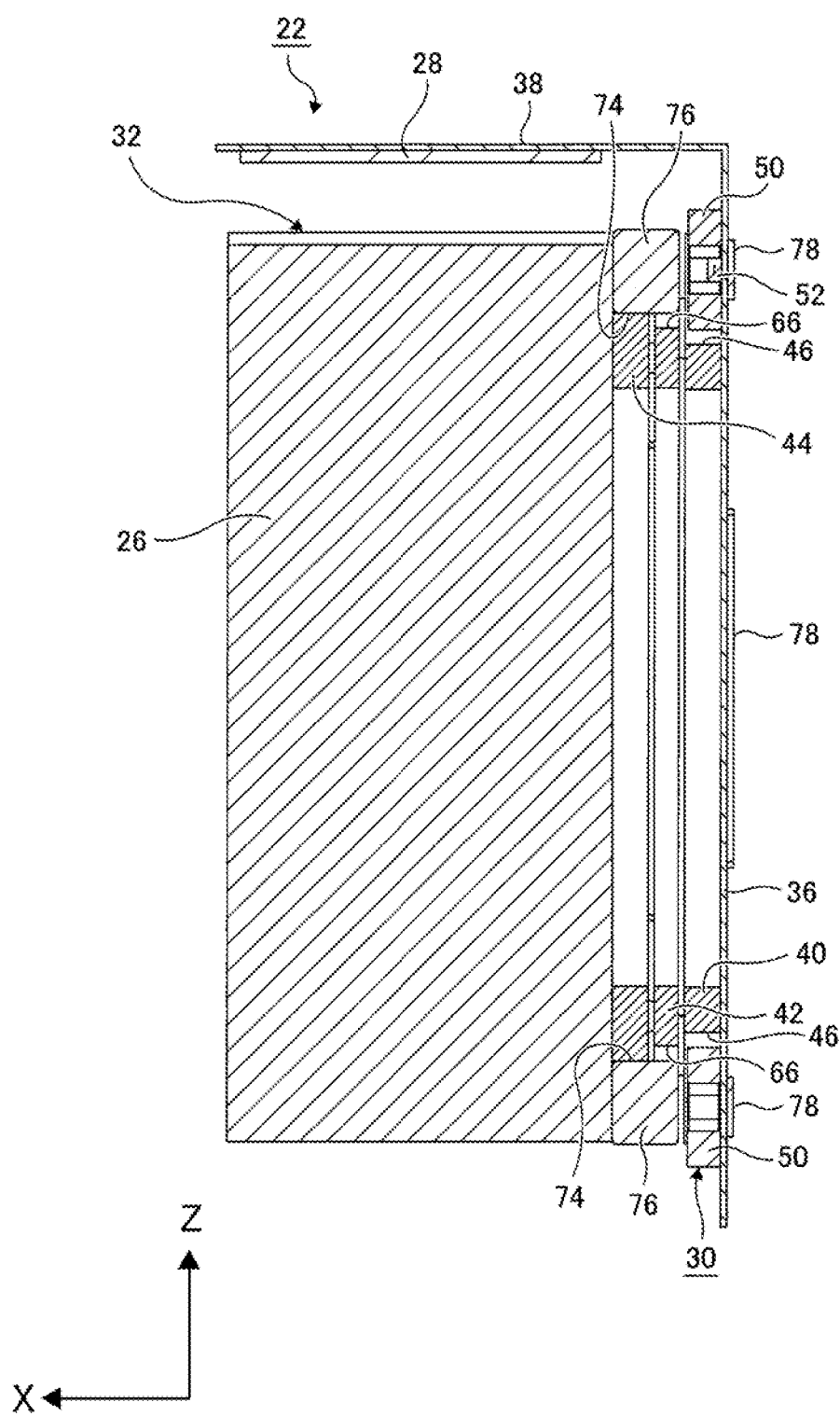
FIG. 8 is a sectional view taken along the line VIII-VIII of FIG. 6 for illustrating the lens unit used in the camera device according to the embodiment of the present invention.
Figure 9:
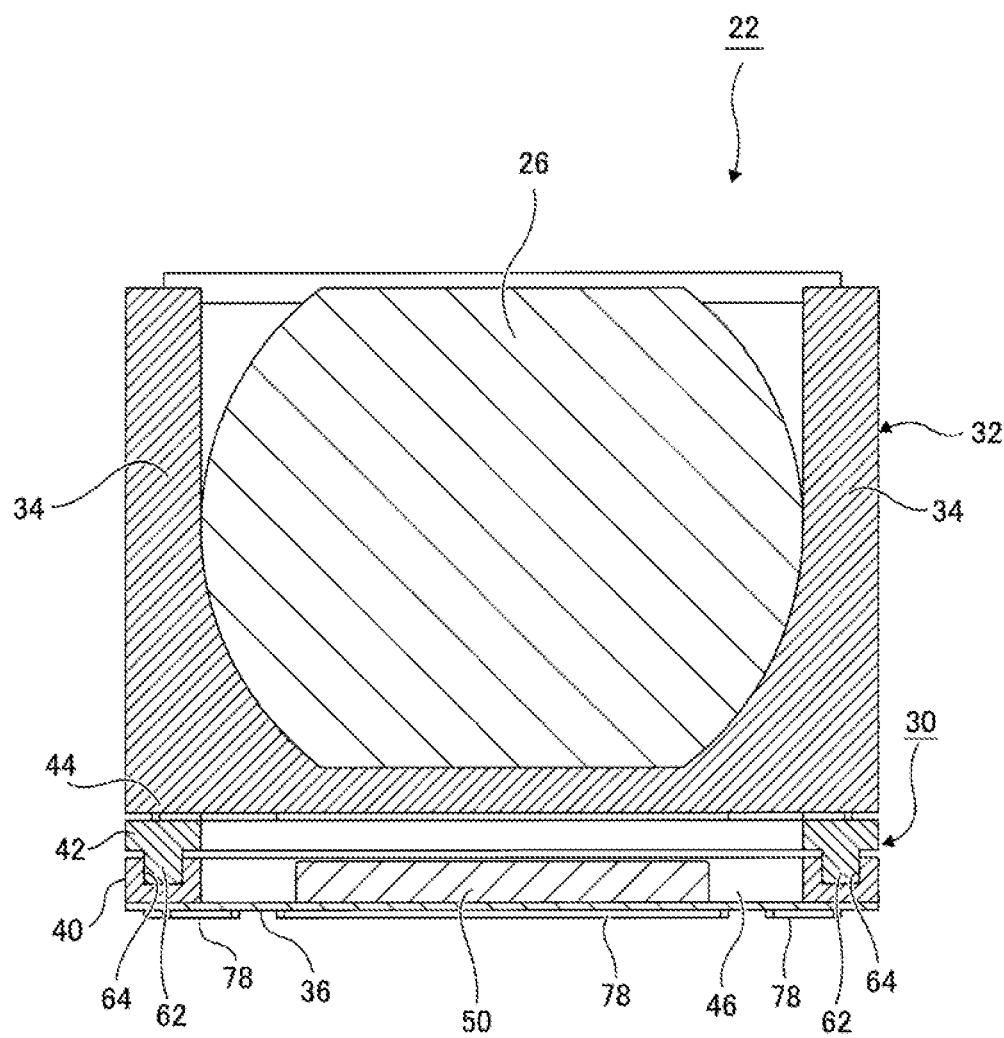
FIG. 9 is a sectional view taken along the line IX-IX of FIG. 6 for illustrating the lens unit used in the camera device according to the embodiment of the present invention.
Figure 10:
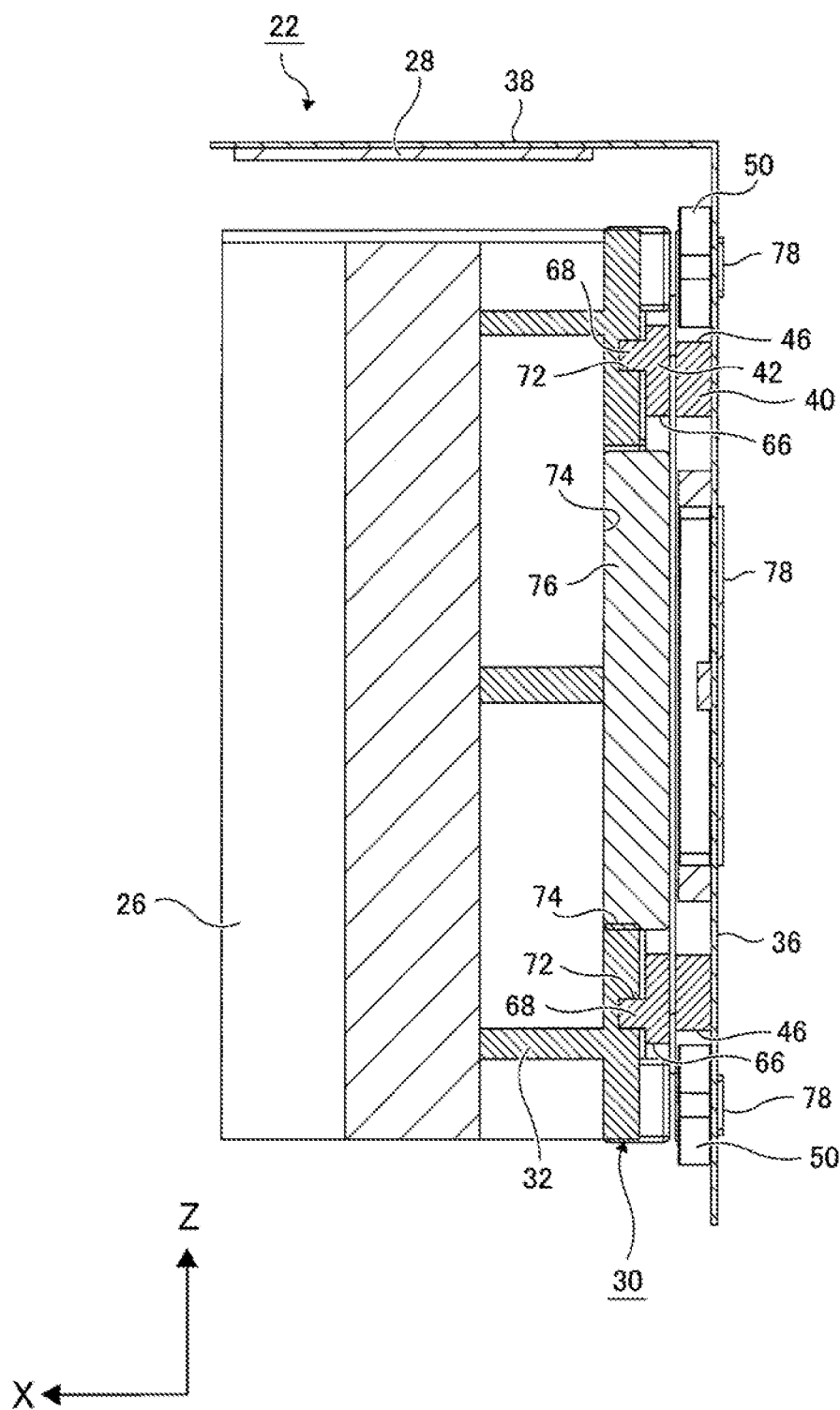
FIG. 10 is a sectional view taken along the line X-X of FIG. 6 for illustrating the lens unit used in the camera device according to the embodiment of the present invention.

Further, first positioning protrusions 56 and 56 protruding downward are formed on lower surfaces of the two first corner portions 48 and 48 arranged on an imaginary diagonal line of the first slider 48 (see FIG. 5). Meanwhile, the substrate 36 has positioning holes 58 and 58 formed so as to correspond to the positioning protrusions 56 and 56, respectively (see FIG. 5). The positioning protrusions 56 and 56 are inserted into the positioning holes 58 and 58, respectively, so that the first slider 40 is positioned and fixed to the substrate 36.

The second slider 42 is held by the first slider 40 so as to be slidable in the X direction. That is, first projecting members 62 extending along the X direction are respectively formed on lower surfaces of distal end portions of four second corner portions 60 of the second slider 42 described later (see FIG. 5), while first grooves 64 extending along the X direction are respectively formed in upper surfaces of the distal end portions of the four first corner portions 48 of the first slider 40 (see FIG. 4). The first projecting members 62 are slidably fitted into the first grooves 64 so as to be movable only along the X direction. The first projecting member 62 and the first groove 64 have substantially the same widths in the Y-direction. Further, a longitudinal length of the first projecting member 62 along the X-direction is smaller than a longitudinal length of the first groove 64 along the X-direction. Thus, the second slider 42 is allowed to move only along the X direction relative to the first slider 40.

Second accommodation parts 66 are respectively formed in the four sides of the second slider 42. The second accommodation parts 66 are formed by being cut out into a quadrangular groove shape inward in the X-Y directions, with the four second corner portions 60 being left uncut. Substantially a lower half of a magnet 76 described later is accommodated in each of the second accommodation parts 66. Further, a distance between an end surface of the second accommodation part 66 and the magnet 76 is kept to be equal to or larger than a distance by which the second slider 42 slides. Further, each of the second corner portions 60 includes a proximal end portion and a distal end portion. The proximal end portion extends as a longitudinal planar lug in the Y direction. The distal end portion extends as a longitudinal planar lug in the X direction further from the proximal end portion. Those proximal end portion and distal end portion have the same shapes as those of the first corner portion 48.

The third slider 44 is held by the second slider 42 so as to be slidable in the Y direction. That is, second projecting members 68 extending along the Y direction are respectively formed on upper surfaces of the proximal end portions of the four second corner portions 60 of the second slider 42 (see FIG. 4), while second grooves 72 extending along the Y direction are respectively formed in lower surfaces of proximal end portions of four third corner portions 70 of the third slider 44 (see FIG. 5). The second projecting members 68 are slidably fitted into the second grooves 72 so as to be movable only along the Y direction. The second projecting member 68 and the second groove 72 have substantially the same widths in the X-direction. Further, a longitudinal length of the second projecting member 68 along the Y-direction is smaller than a longitudinal length of the second groove 72 along the Y-direction. Thus, the third slider 44 is allowed to move only along the Y direction relative to the second slider 42.

Third accommodation parts 74 are respectively formed in the four sides of the third slider 44. The third accommodation parts 74 are formed by being cut out into a quadrangular groove shape inward in the X-Y directions, with the four third corner portions 70 being left uncut. Substantially an upper half of the magnet 76 is fixed in each of the third accommodation parts 74. Further, each of the third corner portions 70 includes a proximal end portion and a distal end portion. The proximal end portion extends as a longitudinal planar lug in the direction. The distal end portion extends as a longitudinal planar lug in the X direction further from the proximal end portion. Those proximal end portion and distal end portion have the same shapes as those of the first corner portion 48. In this embodiment, the third slider 44 and the lens support 32 are formed integrally with each other.

The magnet 76 is fixed a lower surface of the lens support 32 and an inner surface of the third accommodation part 74 of the third slider 44. The magnet 76 is magnetized in a surface opposed to the coil 50 so that, for example, an inner longitudinal half thereof has the N pole, while an outer longitudinal half thereof has the S pole. The inner longitudinal N pole is opposed to the inner longitudinal linear part of the coil 50, and the outer longitudinal S pole is opposed to the outer longitudinal linear part of the coil 50. Further, each of the X-direction position detector 52 and the Y-direction position detector 54 is formed of, for example, a Hall element, and is arranged inside the coil 50. When the detectors are moved relative to the magnets 76, magnetic flux densities are changed, and thus the detectors detect the positions of the magnets 76, that is, the position of the lens 26.

Further, magnetic plate members 78 are fixed to a lower surface of the substrate 36 so as to be opposed to the magnets 76 across the coils 50. The magnets 76 and the magnetic plate members 78 attract each other by magnetic forces so that the substrate 36 is attracted to the third slider 44 in the Z direction.

In the above-mentioned configuration, with energization to the coils 50 and 50 opposed to the magnets 76 and 76 both of which have two magnetic poles arranged in the X direction and which generate magnetic fluxes in the Z direction are interposed, currents flow through the coils 50 and 50 according the Y direction, and as a result, a Lorentz force toward the X direction acts on the coils 50 and 50 according to the Fleming's left hand rule. The lens support 32 is held with respect to the substrate 36 via the first projecting members 62 and the first grooves 64 so as to be slidable along the X direction, and hence the lens support 32 is moved together with the lens 26 in the X direction by a reaction force against the Lorentz force acting on the coils 50 and 50. The position of the lens 26 after being moved in the X direction is detected by the X-direction position detector 52.

Further, with the energization to the coils 50 and 50 opposed to the magnets 76 and 76 both of which have two magnetic poles arranged in the Y direction and which generate magnetic fluxes in the Z direction are interposed, currents flow through the coils 50 and 50 along the X direction, and as a result, the Lorentz force toward the Y direction acts on the coils 50 and 50 according to the Fleming's left hand rule. The lens support 32 is held with respect to the substrate 36 via the second projecting members 68 and the second grooves 72 so as to be slidable along the Y direction, and hence the lens support 32 is moved together with the lens 26 in the Y direction by the reaction force against the Lorentz force acting on the coils 50 and 50. The position of the lens 26 after being moved in the Y direction is detected by the Y-direction position detector 54. When the lens 26 is moved in the Y-axis direction, the light exiting from the lens 26 deviates in the Y-axis direction, and thus a light position in the Y-axis direction of the light entering the image sensor 28 is adjusted. Through the rotation of the prism 20 about the Y axis and the movement of the lens 26 in the Y-axis direction, image stabilization can be achieved. Further, when the lens 26 is moved in the X-axis direction, focus adjustment is enabled. In this case, the movement of the lens support 32 is restricted by the first projecting members 62 and the first grooves 64, and the second projecting members 68 and the second grooves 72 extending along the X-Y directions. Thus, rotation about the Z axis is suppressed. Therefore, deviation of the lens support 32 with respect to the image sensor 28 is small, and thus precise position control is enabled.

In the above-mentioned embodiment, the lens 26 is used as a focus lens, however, two lenses may be provided so that the optical axis thereof are coincided with the optical axis direction to obtain a configuration as a lens driving device having a zoom function in addition to the autofocus function. In this case, the prism unit 19 is not required to be provided. Further, when two lenses are provided in the optical axis direction, two sets of first to third sliders may be arranged side by side in the optical axis direction being the X direction. Besides, one first slider 40 and one second slider 42 fixed to the fixing portion may be shared by the two lenses, and the lenses may be mounted on two third sliders 44 and 44, respectively. In this case, the first projecting members 62 and the first grooves 64 are formed to extend along the direction, while the second projecting members 68 and the second grooves 72 are formed to extend along the X direction.

Further, the first projecting members 62 and the first grooves 64, and the second projecting members 68 and the second grooves 72 may be replaced with each other in terms of the projecting and grooved shapes. Further, the extending direction of the first projecting members 62 and the first grooves 64 and the extending direction of the second projecting members 68 and the second grooves 72 may be replaced with each other. Further, the positions of the magnets 76 and the coils 50 may be replaced with each other, including the magnetic plate members 78.

Further, each of the second accommodation parts 66 may accommodate both of the coil 50 and the magnet 76, or may accommodate only the coil 50. In this case, the smaller one of the distance between the end surface of the second accommodation part 66 and the magnet 76 and the distance between the end surface of the second accommodation part 66 and the coil 50 is ensured to be equal to or larger than the distance by which the second slider 42 slides. Further, when neither of the coil 50 nor the magnet 76 is accommodated in the second accommodation part 66, the second accommodation part 66 is not required to be formed.

What is claimed is:

1. A lens driving device, comprising:
    a fixing portion;
    a lens support configured to support a lens;
    a first slider fixed to the fixing portion;
    a second slider held by the first slider so as to be slidable in a first direction corresponding to any one of an optical axis direction of the lens and one direction orthogonal to the optical axis direction; and
    a third slider which is provided on the lens support, and is held by the second slider so as to be slidable in a second direction corresponding to another one of the optical axis direction of the lens and the one direction orthogonal to the optical axis direction,
    wherein any one of the first slider and the second slider has a first projecting member extending along the first direction, and another one of the first slider and the second slider has a first groove that is to fit over the first projecting member, and
    wherein any one of the second slider and the third slider has a second projecting member extending along the second direction, and another one of the second slider and the third slider has a second groove that is to fit over the second projecting member.

2. The lens driving device according to claim 1, further comprising:
    a magnet provided on any one of the fixing portion and the lens support; and
    a coil provided on another one of the fixing portion and the lens support.

3. The lens driving device according to claim 2,
    wherein the first slider is formed into a quadrangular frame shape,
    wherein the first slider has a first accommodation part that is formed by cutting out a side portion of the first slider inward, and a first corner portion that is formed at a corner portion of the first slider, and
    wherein one of the magnet and the coil is accommodated in the first accommodation part.

4. The lens driving device according to claim 3, wherein one of the first projecting member and the first groove is arranged in the first corner portion.

5. The lens driving device according to claim 2,
    wherein the third slider is formed into a quadrangular frame shape,
    wherein the third slider has a third accommodation part that is formed by cutting out a side portion of the third slider inward, and a third corner portion that is formed at a corner portion of the third slider, and
    wherein another one of the magnet and the coil is accommodated in the third accommodation part.

6. The lens driving device according to claim 5, wherein one of the second projecting member and the second groove is arranged in the third corner portion.

7. The lens driving device according to claim 2,
    wherein the second slider is formed into a quadrangular frame shape,
    wherein the second slider has a second accommodation part that is formed by cutting out a side portion of the second slider inward, and a second corner portion that is formed at a corner portion of the second slider, and
    wherein a part of at least one of the magnet and the coil is accommodated in the second accommodation part.

8. The lens driving device according to claim 7, wherein the second accommodation part has an end surface separated away from one of the coil and the magnet accommodated in the second accommodation part by a distance equal to or larger than a distance by which the second slider slides.

9. The lens driving device according to claim 7, wherein another one of the first projecting member and the first groove, and another one of the second projecting member and the second groove are arranged in the second corner portion.

10. The lens driving device according to claim 2, further comprising a magnetic plate member provided on the another one of the fixing portion and the lens support across the coil.

11. The lens driving device according to claim 1,
wherein the first slider, the second slider, and the third slider are formed into quadrangular frame shapes having a first corner portion, a second corner portion, and a third corner portion, respectively,
wherein at least one of the first corner portion, the second corner portion, or the third corner portion has a first part extending in the optical axis direction and a second part further extending in the one direction orthogonal to the optical axis direction, and
wherein, among the first projecting member, the first groove, the second projecting member, and the second groove, portions extending along the optical axis direction are arranged in the first part, and portions extending along the one direction are arranged in the second part.

12. The lens driving device according to claim 1, wherein the lens support and the third slider are formed integrally with each other.

13. A camera device, comprising a lens driving device including:
a fixing portion;
a lens support configured to support a lens;
a first slider fixed to the fixing portion;
a second slider held by the first slider so as to be slidable in a first direction corresponding to any one of an optical axis direction of the lens and one direction orthogonal to the optical axis direction; and
a third slider which is provided on the lens support, and is held by the second slider so as to be slidable in a second direction corresponding to another one of the optical axis direction of the lens and the one direction orthogonal to the optical axis direction,
wherein any one of the first slider and the second slider has a first projecting member extending along the first direction, and another one of the first slider and the second slider has a first groove that is to fit over the first projecting member, and
wherein any one of the second slider and the third slider has a second projecting member extending along the second direction, and another one of the second slider and the third slider has a second groove that is to fit over the second projecting member.

14. An electronic apparatus, comprising the camera device having a lens driving device including:
a fixing portion;
a lens support configured to support a lens;
a first slider fixed to the fixing portion;
a second slider held by the first slider so as to be slidable in a first direction corresponding to any one of an optical axis direction of the lens and one direction orthogonal to the optical axis direction; and
a third slider which is provided on the lens support, and is held by the second slider so as to be slidable in a second direction corresponding to another one of the optical axis direction of the lens and the one direction orthogonal to the optical axis direction,
wherein any one of the first slider and the second slider has a first projecting member extending along the first direction, and another one of the first slider and the second slider has a first groove that is to fit over the first projecting member, and
wherein any one of the second slider and the third slider has a second projecting member extending along the second direction, and another one of the second slider and the third slider has a second groove that is to fit over the second projecting member.

\* \* \* \* \*